United States Patent
Kariya (10) Patent No.: US 9,634,937 B2
(45) Date of Patent: Apr. 25, 2017

(54) RELAY SYSTEM AND RELAY DEVICE

(71) Applicant: Hitachi Metals, Ltd., Minato-ku, Tokyo (JP)

(72) Inventor: Kazutoshi Kariya, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 191 days.

(21) Appl. No.: 14/588,488

(22) Filed: Jan. 2, 2015

(65) Prior Publication Data

US 2016/0072711 A1 Mar. 10, 2016

(30) Foreign Application Priority Data

Sep. 9, 2014 (JP) ................................. 2014-183601

(51) Int. Cl.
| | | |
|---|---|---|
| H04L 12/56 | (2006.01) | |
| H04L 29/06 | (2006.01) | |
| H04L 29/08 | (2006.01) | |
| H04L 29/12 | (2006.01) | |
| H04L 12/741 | (2013.01) | |
| H04L 12/933 | (2013.01) | |

(52) U.S. Cl.
CPC .......... *H04L 45/745* (2013.01); *H04L 49/102* (2013.01)

(58) Field of Classification Search
CPC ......... H04L 45/02; H04L 45/22; H04L 45/26; H04L 12/185; H04L 45/54; H04L 45/586; H04L 45/74
See application file for complete search history.

(56) References Cited

U.S. PATENT DOCUMENTS

| | | | | |
|---|---|---|---|---|
| 7,009,974 B1* | 3/2006 | Fotedar | ................. | H04L 61/103 370/392 |
| 7,996,894 B1* | 8/2011 | Chen | ....................... | H04L 63/02 370/389 |
| 8,583,753 B1* | 11/2013 | Bhagwatula | ............ | H04L 67/16 709/208 |
| 2002/0138628 A1* | 9/2002 | Tingley | ............. | H04L 29/12009 709/227 |
| 2004/0078481 A1* | 4/2004 | Rudd | ................. | H04L 29/12349 709/238 |
| 2004/0133690 A1* | 7/2004 | Chauffour | ............... | H04L 29/06 709/229 |
| 2010/0325257 A1* | 12/2010 | Goel | ................. | H04L 29/12028 709/223 |
| 2011/0249551 A1* | 10/2011 | Rollins | ................. | H04L 12/437 370/222 |
| 2013/0028076 A1 | 1/2013 | Wu | | |

(Continued)

FOREIGN PATENT DOCUMENTS

JP 2013-519265 A 5/2013

*Primary Examiner* — Wutchung Chu
(74) *Attorney, Agent, or Firm* — Crowell & Moring LLP (57) ABSTRACT

A ring control unit controls the ring network by transmitting and receiving a control frame through ring ports, and receives an address table deletion command via the control frame. When a first deletion command is received, an address table processing unit prohibits a learning process to the address table and then starts deleting the address table. Then, when a N-th (N is an integer of 2 or more) deletion command is received in a period before the completion of the deletion of the address table, the address table processing unit continues to execute the deletion of the address table.

10 Claims, 10 Drawing Sheets

(56) References Cited

U.S. PATENT DOCUMENTS

2013/0108263 A1* 5/2013 Srinivas ............... H04Q 3/0083
  398/45
2013/0279909 A1* 10/2013 Srinivas ................ H04B 10/27
  398/58
2013/0343179 A1* 12/2013 Madaiah et al. ...... H04L 12/437
  370/222

* cited by examiner

FDB: ADDRESS TABLE

| ENTRY NUMBER | MAC ADDRESS | VID | PORT ID |
|---|---|---|---|
| 1 | MA1 | 1 | {Pr[1]} |
| 2 | MA2 | 1 | {Pr[2]} |
| ... | ... | ... | ... |
| i | MA3 | 1 | {Pu[1]} |
| ... | ... | ... | ... |
| j | MA4 | 2 | {Pr[1]} |
| ... | ... | ... | ... |
| k | MA5 | 2 | {Pu[m]} |
| ... | ... | ... | ... |

Entries 1 and 2: SUBJECT OF FLUSHING

RELAY SYSTEM AND RELAY DEVICE

CROSS-REFERENCE TO RELATED APPLICATION

The present application claims priority from Japanese Patent Application No. 2014-183601 filed on Sep. 9, 2014, the content of which is hereby incorporated by reference into this application.

TECHNICAL FIELD OF THE INVENTION

The present invention relates to a relay system and a relay device, for example, a relay system and a relay device using a ring protocol specified by ITU-T (International Telecommunication Union Telecommunication Standardization Sector) G.8032.

BACKGROUND OF THE INVENTION

For example, Japanese Patent Application Laid-Open Publication No. 2013-519265 (Patent Document 1) describes a method for preventing repetitive refreshing of an address table which occurs at a neighbor node in the recovery from a fault in a ring network using a ring protocol specified by ITU-T G.8032. Specifically, in the recovery from a fault, a neighbor node usually receives a fault switch-back frame (NR, RB) from an owner node and deletes information of blocked port retained by both ring ports. According to the method of the Patent Document 1, however, the neighbor node does not delete the information of blocked port but updates it with information of the blocked port contained in the fault switch-back frame.

SUMMARY OF THE INVENTION

As described in the Patent Document 1, for example, the ring protocol specified by ITU-T G.8032 has been known as one of ring protocols. This ring protocol is sometimes referred to as ERP (Ethernet Ring Protection). The ring protocol specifies that flushing (deletion) of an address table (FDB (Forwarding DataBase)) is executed in accordance with, for example, a R-APS (SF) frame, R-APS (NR, RB) frame, and others. Although details will be described later, the R-APS (SF) frame functions as a fault notification frame and the R-APS (NR, RB) frame functions as a fault switch-back frame.

Here, in the ring protocol, each relay device on the ring network sometimes receives fault notification frames resulting from the same fault several times in sequence. In such a case, the relay device has to execute flushing of the address table (FDB) every time when receiving the fault notification frame. Meanwhile, the time required for the flushing of the address table (FDB) is sufficiently longer than the reception interval of the fault notification frames in some cases. In this case, the flushing is restarted all over again while the flushing of the address table (FDB) is still being executed. As a result, a period required for substantially completing the flushing of the address table (FDB) becomes longer, which may lead to a problem that high-speed path switching on the ring network becomes difficult.

The present invention has been made in view of the problem mentioned above, and an object of the present invention is to realize high-speed path switching on a ring network in a relay system and a relay device using a ring protocol specified by ITU-T G.8032.

The above and other objects and novel characteristics of the present invention will be apparent from the description of the present specification and the accompanying drawings.

The following is a brief description of an outline of the typical embodiment of the invention disclosed in the present application.

A relay system according to the present embodiment is provided with a plurality of relay devices constituting a ring network. At least one of the plurality of relay devices includes: a plurality of ports including a first port and a second port; an address table; an address table processing unit; and a ring control unit. The first port and the second port are connected to the ring network. The address table retains a correspondence relation among a MAC address, a VLAN identifier, and the plurality of ports. The address table processing unit performs a process to the address table. The ring control unit controls the ring network by transmitting and receiving a control frame through the first port or the second port and receives a deletion command to delete the address table via the control frame. Here, when the first deletion command is received, the address table processing unit prohibits a learning process of the correspondence relation retained in the address table and then starts deleting the address table. Then, when the N-th (N is an integer of 2 or more) deletion command is received in a period before completion of the deletion of the address table, the address table processing unit continues to execute the deletion of the address table.

The effects obtained by typical embodiments of the invention disclosed in the present application will be briefly described below. That is, it is possible to realize high-speed path switching on a ring network in a relay system and a relay device using a ring protocol specified by ITU-T G.8032.

BRIEF DESCRIPTIONS OF THE DRAWINGS

FIG. 10 is a flowchart illustrating an example of the process contents performed by the ERP control unit of FIGS.

6 and 8 in a relay device according to the second embodiment of the present invention.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

General Configuration and General Operation of Relay System (Premise)

Figure 1:
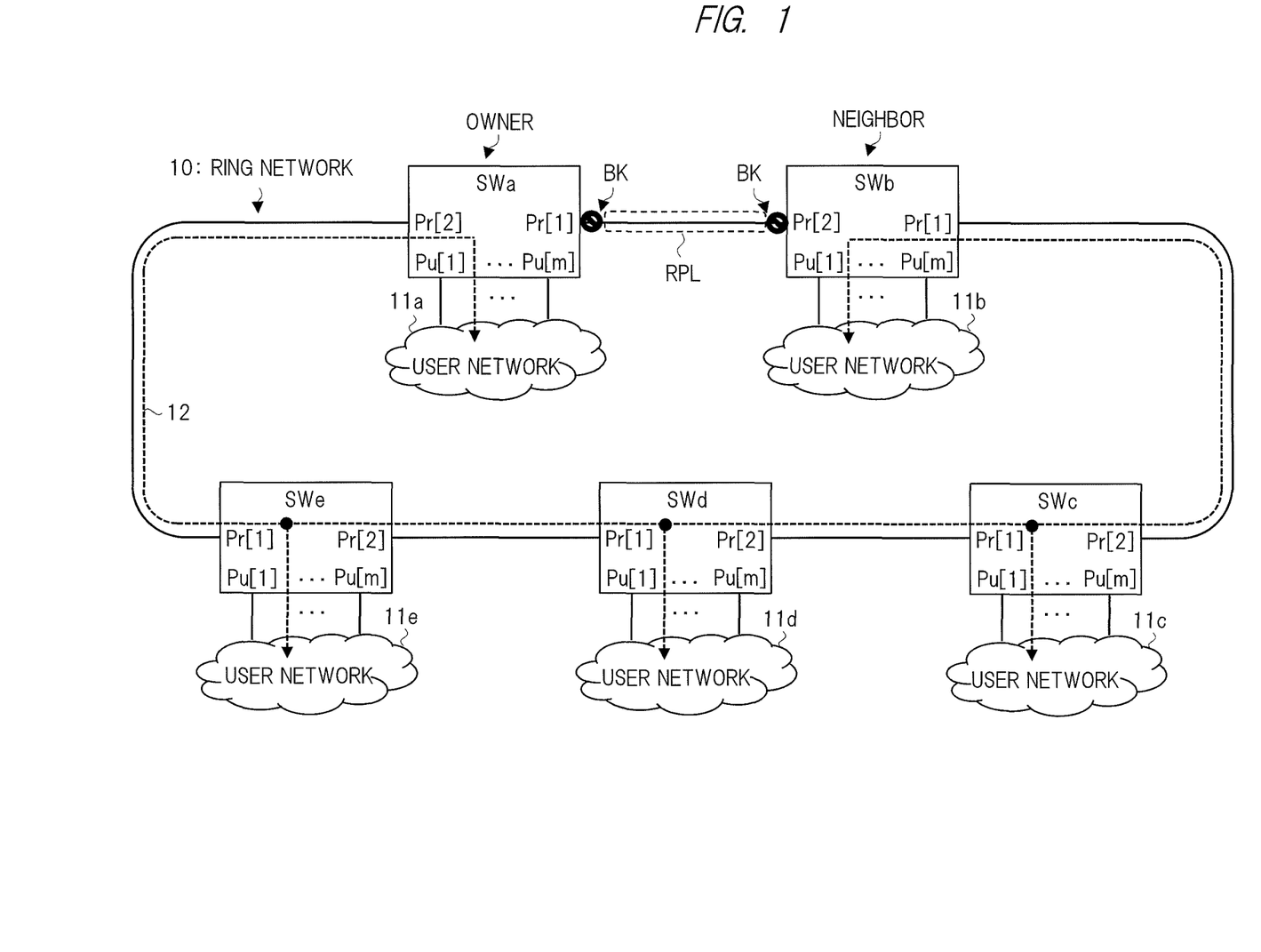
FIG. 1 is a schematic diagram illustrating a configuration example to be a premise of a relay system according to the first embodiment of the present invention.

FIG. 1 is a schematic diagram illustrating a configuration example to be a premise of a relay system according to the first embodiment of the present invention. The relay system illustrated in FIG. 1 includes a plurality of (here, 5) relay devices SWa to SWe constituting a ring network 10. Each of the relay devices SWa to SWe has two ring ports (first and second ports) Pr[1] and Pr[2] and m (m is an integer of 1 or more) user ports Pu[1] to Pu[m]. Although the number of relay devices constituting the ring network 10 is assumed to be 5 in this example, the number is not limited to this, and may be 2 or more.

The ring network 10 is controlled based on, for example, a ring protocol specified by ITU-T G 8032. In other words, each of the relay devices SWa to SWe is provided with various control functions based on the ring protocol. Each of the relay devices SWa to SWe is a L2 switch which performs relay process of a layer 2 (L2) of an OSI reference model or may be a L3 switch which performs relay process of a layer 3 (L3). However, since the relay process on the ring network 10 is performed based on the L2, the case where each of the relay devices SWa to SWe is the L2 switch is taken as an example here.

The two ring ports Pr[1] and Pr[2] are each connected to the ring network 10. In other words, each of the relay devices SWa to SWe is connected via the ring ports Pr[1] and Pr[2] in a ring shape, so that the ring network 10 is formed. In the example of FIG. 1, the ring ports (first ports) Pr[1] of the relay devices SWa, SWb, SWc, SWd and SWe are connected to the ring ports (second ports) Pr[2] of the neighboring relay devices SWb, SWc, SWd, SWe and SWa via a communication line, respectively.

The user ports Pu[1] to Pu[m] are connected to predetermined user networks. In the example of FIG. 1, the user ports Pu[1] to Pu[m] of the relay devices SWa to SWe are connected to user networks 11a to 11e, respectively. In each of the user networks 11a to 11e, relay devices, various information processing devices (server device, terminal device and others) and others are arranged appropriately.

Here, based on ITU-T G.8032, the relay device SWa is set as an owner node, and the relay device SWb is set as a neighbor node. A link between the owner node and the neighbor node is referred to as RPL (Ring Protection Link). When there is no fault on the ring network 10, the relay device SWa controls the ring port Pr[1] located at one end of the RPL to a block state BK, and the relay device SWb controls the ring port Pr[2] located at the other end of RPL to the block state BK. The port controlled to the block state BK blocks frames from passing through it.

When there is no fault on the ring network 10, this RPL prevents the looping of a communication path on the ring network 10. More specifically, as illustrated in FIG. 1, a communication path 12 via the relay devices SWe, SWd and SWc is formed between the relay device SWa and the relay device SWb. Frame transfer between the user networks 11a to 11e is performed on this communication path 12.

Figure 2:
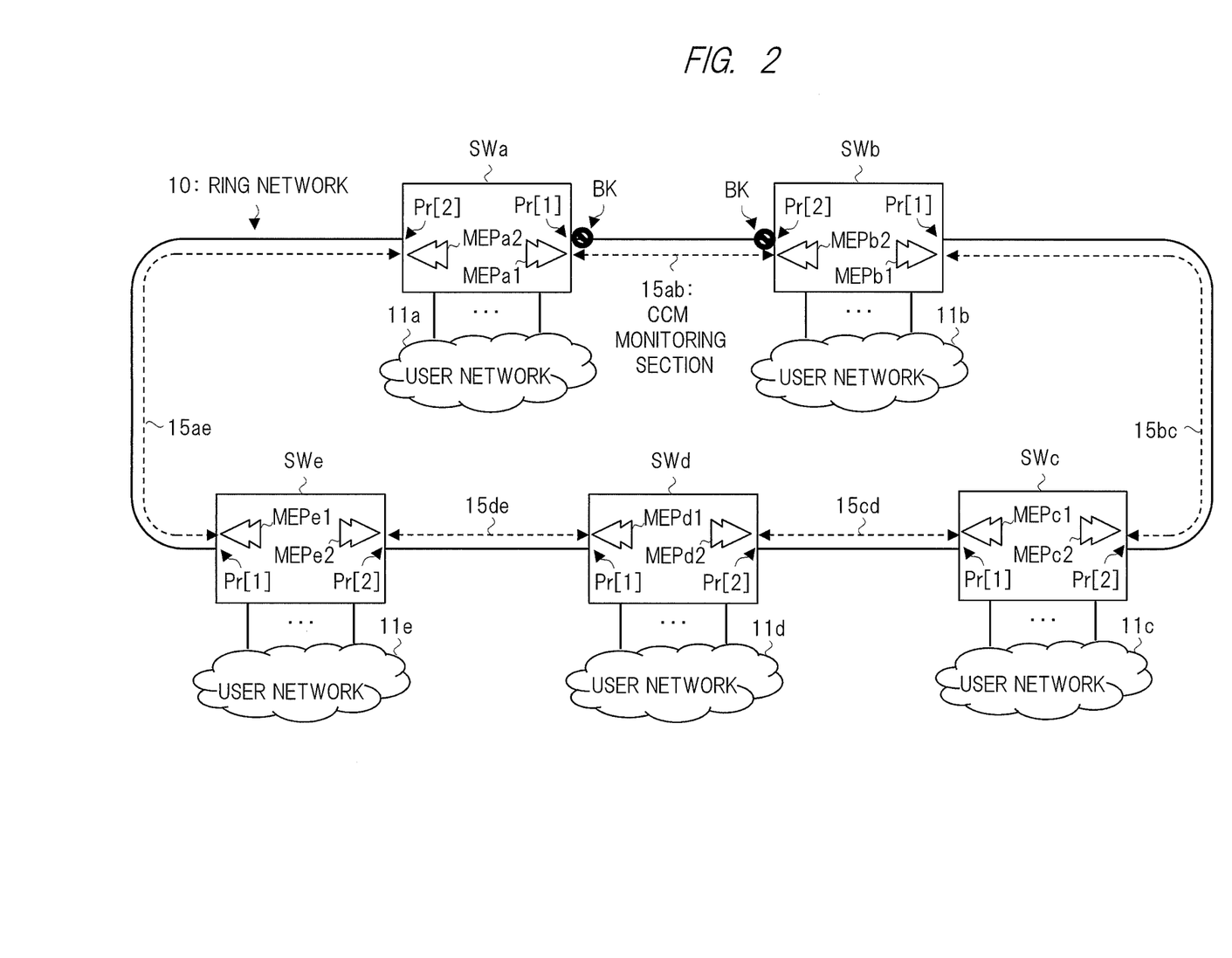
FIG. 2 is a schematic diagram illustrating an example of a fault monitoring method in the relay system of FIG. 1.

FIG. 2 is a schematic diagram illustrating an example of a fault monitoring method in the relay system of FIG. 1. As illustrated in FIG. 2, the relay devices SWa to SWe are provided with monitoring points MEPa1 to MEPe1 corresponding to the ring ports (first ports) Pr[1] respectively, and are provided with monitoring points MEPa2 to MEPe2 corresponding to the ring ports (second ports) Pr[2] respectively.

Here, ITU-T G.8032 specifies that a CC (Continuity check) function of Ethernet (registered trademark) OAM is used for monitoring presence or absence of fault in a link between the relay devices. Ethernet OAM has been standardized by "ITU-T Y.1731" and "IEEE802.1ag", etc. as a standard for monitoring the continuity between devices. In the CC function, a monitoring section is set by monitoring points referred to as MEP (Maintenance End Point) as illustrated in FIG. 2. MEPs at both ends of each monitoring section monitor the continuity of each monitoring section by transmitting and receiving a CCM (Continuity Check Message) frame which is a continuity monitoring frame at regular intervals.

In the example of FIG. 2, the monitoring point MEPa1 of the relay device SWa sets a CCM monitoring section 15ab between itself and the monitoring point MEPb2 of another device (SWb), thereby monitoring the continuity between the first port Pr[1] of its own device and the second port Pr[2] of the other device (SWb) connected thereto. Meanwhile, the monitoring point MEPb2 of the relay device SWb also sets the CCM monitoring section 15ab between itself and the monitoring point MEPa1 of another device (SWa), thereby monitoring the continuity between the second port Pr[2] of its own device and the first port Pr[1] of the other device (SWa) connected thereto.

Similarly, CCM monitoring sections 15*bc*, 15*cd*, 15*de*, and 15*ae* are sequentially set on the ring network 10. In each CCM monitoring section (for example, 15*ab*), when the monitoring point on one end (MEPa1) does not receive a CCM frame from the monitoring point on the other end (MEPb2) within a predetermined period, the monitoring point on one end recognizes the continuity with respect to the monitoring point of the other end (MEPb2) as a LOC (Loss Of Continuity) state. The predetermined period is, for example, 3.5 times as long as a transmission interval of the CCM frame (typically 3.3 ms).

In this case, the monitoring point of one end (MEPa1) transmits the CCM frame having a flag attached to a RDI (Remote Detect Indication) bit when transmitting the CCM frame to the monitoring point of the other end (MEPb2). The monitoring point of the other end (MEPb2) recognizes the continuity with respect to the monitoring point of one end (MEPa1) as a RDI state by receiving the CCM frame having a flag attached to the RDI bit from the monitoring point of one end (MEPa1). Each of the relay devices SWa to SWe determines presence or absence of fault in the link connected to the ring ports Pr[1] and Pr[2] of its own device based on presence or absence of recognition of a LOC state or a RDI state in the monitoring points (MEP) of its own device.

<<Operation of Relay System at the Time of Fault Presence (Premise)>>

Figure 3:
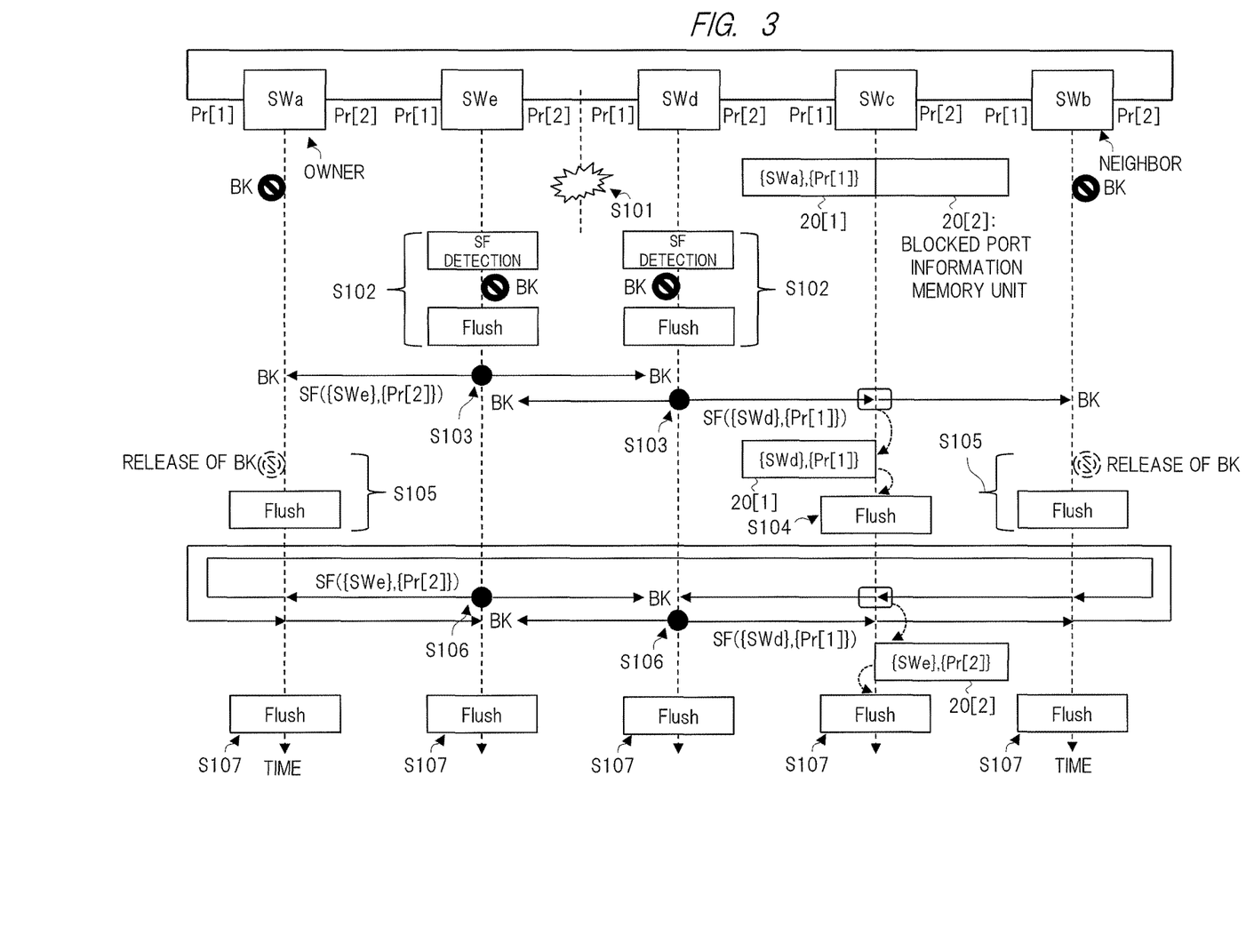
FIG. 3 is a diagram illustrating an example of an operation sequence at the time of fault presence to be a premise of the relay system of FIG. 1.

FIG. 3 is a diagram illustrating an example of an operation sequence at the time of fault presence to be a premise of the relay system of FIG. 1. In FIG. 3, first, the ring port Pr[1] of the relay device SWa serving as an owner node and the ring port Pr[2] of the relay device SWb serving as a neighbor node are both controlled to a block state BK.

In this state, though not illustrated, the relay device SWa serving as the owner node transmits R-APS (NR, RB) frames specified by ITU-T G.8032 on the ring network 10 at regular intervals (for example, every 5 s). The R-APS frame is a kind of a control frame based on Ethernet OAM, and is recognized by information of an OpCode region in the frame or the like. NR denotes absence of request (No Request) and RB denotes the block of RPL (RPL Blocked).

Specifically, the R-APS (NR, RB) frame means that the ring network 10 has no fault and the RPL (in other words, the ring port Pr[1] of the relay device SWa) is thus controlled to the block state BK. The R-APS (NR, RB) frame is transmitted also in the case of performing a switch-back operation in the recovery from a fault in addition to the case of no fault like this. When the switch-back operation is carried out, the R-APS (NR, RB) frame functions as a fault switch-back frame.

In this case, the R-APS (NR, RB) frame contains information of a port controlled to the block state BK (the port is referred to as blocked port and the information is referred to as blocked port information in this embodiment). Here, the blocked port information is {SWa} and {Pr[1]}. {SWa} represents a node identifier (ID) of the relay device SWa, and {Pr[1]} represents a port identifier (ID) of the ring port PR[1]. In this manner, in the present specification, {AA} is assumed to represent an identifier of "AA".

As illustrated in FIG. 3, each of the plurality of relay devices SWa to SWe is provided with blocked port information memory units 20[1] and 20[2]. FIG. 3 illustrates the blocked port information memory units of the relay device SWc as a typical example of the blocked port information memory units of the plurality of relay devices SWa to SWe. When the relay device SWc receives blocked port information at the ring port Pr[1], the relay device SWc retains the blocked port information in the blocked port information memory unit 20[1]. Also, when the relay device SWc receives blocked port information at the ring port Pr[2], the relay device SWc retains the blocked port information in the blocked port information memory unit 20[2]. In the example of FIG. 3, since the relay device SWc receives a R-APS (NR, RB) frame containing the blocked port information ({SWa} and {Pr[1]}) from the relay device SWa at the ring port Pr[1], the relay device SWc retains the blocked port information in the blocked port information memory unit 20[1].

The case where a fault occurs on the link between the relay device SWd and the relay device SWe in the above-mentioned situation as indicated by step S101 of FIG. 3 is assumed. In this case, as indicated by step S102, the relay device SWd detects the fault (SF) on the link connected to the ring port Pr[1] based on the monitoring result at the monitoring point MEPd1 illustrated in FIG. 2. SF is an abbreviation of signal fail. In response to this, the relay device SWd controls the ring port Pr[1] to the block state BK and flushes (deletes) an address table (FDB).

Similarly, as indicated by step S102, the relay device SWe also detects the fault (SF) on the link connected to the ring port Pr[2] based on the monitoring result at the monitoring point MEPe2 illustrated in FIG. 2. In response to this, the relay device SWe controls the ring port Pr[2] to the block state BK and flushes (deletes) an address table (FDB).

Subsequently, as indicated by step S103, the relay device SWd which has detected the fault (SF) transmits a first R-APS (SF) frame containing blocked port information ({SWd}, {Pr[1]}) on the ring network 10. The R-APS (SF) frame functions as a fault notification frame. In the same manner, the relay device SWe also transmits a first R-APS (SF) frame containing blocked port information ({SWe}, {Pr[2]}) on the ring network 10.

The R-APS (SF) frames transmitted by the relay devices SWd and SWe are relayed by each relay device until the frames reach the ring port in the block state BK. Here, as indicated by step S104, when receiving the R-APS (SF) frame from the relay device SWd, the relay device SWc flushes the address table (FDB).

More specifically, in the relay device SWc, the blocked port information ({SWd}, {Pr[1]}) contained in the R-APS (SF) frame from the relay device SWd is different from the blocked port information ({SWa}, {Pr[1]}) retained in the blocked port information memory unit 20[1]. Therefore, rewriting of the blocked port information occurs in the blocked port information memory unit 20[1].

Furthermore, the blocked port information ({SWd}, {Pr[1]}) contained in the R-APS (SF) frame is different also from blocked port information retained in the blocked port information memory unit 20[2] (blank in this case). In this manner, when rewriting of the blocked port information occurs and rewritten blocked port information is different from blocked port information retained in the other blocked port information memory unit, the relay device SWc flushes the address table (FDB).

Also, as indicated by step S105, when the relay device SWa serving as an owner node receives the R-APS (SF) frame from the relay device SWe, the relay device SWa releases the block state BK of the ring port Pr[1] (namely, changes the ring port Pr[1] to an open state) and flushes the address table (FDB). At this time, since the relay device SWa receives the R-APS (SF) frame in a period when the ring port Pr[1] is in the block state BK, the relay device SWa does not relay the R-APS (SF) frame to the ring port Pr[1].

In the same manner, as indicated by step S105, when the relay device SWb serving as a neighbor node receives the R-APS (SF) frame from the relay device SWd, the relay device SWb also releases the block state BK of the ring port Pr[2] and flushes the address table (FDB). At this time, since the relay device SWb receives the R-APS (SF) frame in a period when the ring port Pr[2] is in the block state BK, the relay device SWb does not relay the R-APS (SF) frame to the ring port Pr[2].

Subsequently, as indicated by step S106, the relay devices SWd and SWe both transmit second R-APS (SF) frames. For example, based on ITU-T G.8032, the R-APS (SF) frame is transmitted three times every 3.3 ms, and is thereafter transmitted every 5 s. In this case, the second R-APS (SF) frame is transmitted after 3.3 ms of the transmission of the first R-APS (SF) frame.

The second R-APS (SF) frame transmitted by the relay device SWd passes through the ring port Pr[2] of the relay device SWb that is released from the block state BK at step S105 mentioned above. In the same manner, the second R-APS (SF) frame transmitted by the relay device SWe also passes through the ring port Pr[1] of the relay device SWa that is released from the block state BK at step S105 mentioned above.

As a result, as indicated by step S107, for example, the relay device SWc receives the R-APS (SF) frame containing blocked port information ({SWe}, {Pr[2]}) that is transmitted from the relay device SWe. In this case, rewriting of the blocked port information occurs in the blocked port information memory unit 20[2] of the relay device SWc, and the rewritten blocked port information is different from the blocked port information retained in the blocked port information memory unit 20[1]. Thus, the relay device SWc flushes the address table (FDB).

Furthermore, though details thereof are omitted, the other relay devices SWa, SWb, SWd, and SWe also execute the flushing of the address table (FDB) in the same manner in response to the rewriting of the blocked port information. After that, the R-APS (SF) frame is transmitted at regular intervals by the relay devices SWd and SWe, but a steady state is reached because rewriting of the blocked port information does not occur.

Figure 4:
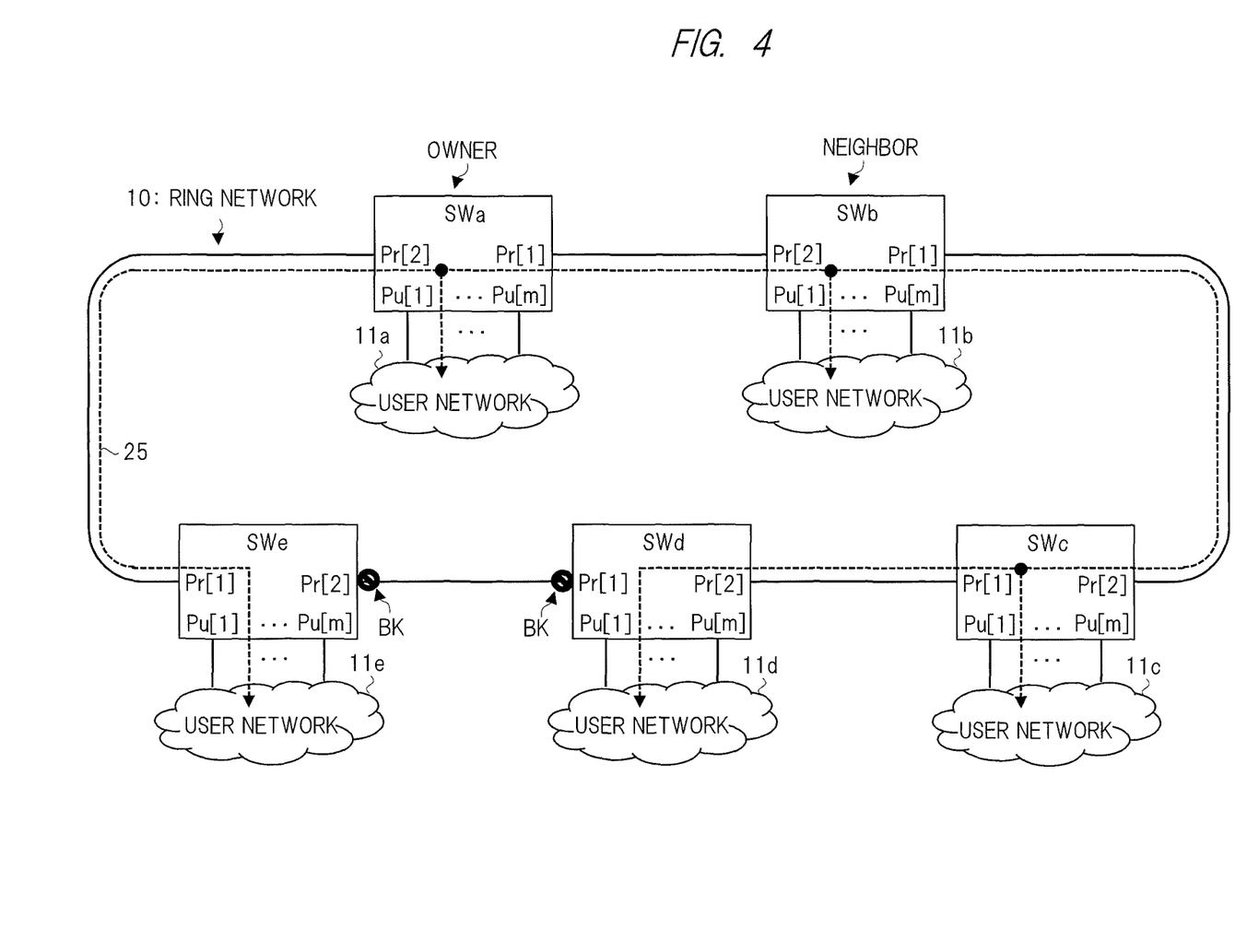
FIG. 4 is a diagram illustrating a frame transfer path after path switching of the ring network is performed by the operation of FIG. 3.

FIG. 4 is a diagram illustrating a frame transfer path after path switching of the ring network is performed by the operation of FIG. 3. When the operation of FIG. 3 has been executed and the steady state has been reached, a communication path 25 via the relay devices SWa, SWb and SWc is formed between the relay device SWe and the relay device SWd as illustrated in FIG. 4. The frame transfer between the user networks 11a to 11e is performed on this communication path 25.

<<Problem of Relay System (Premise)>>

As described above with reference to FIG. 3, each relay device (for example, SWc) usually starts the flushing (deletion) of the address table (FDB) in response to the first R-APS (SF) frame (step S104), and starts the flushing again in response to the second R-APS (SF) frame (step S107). The interval between the first flushing and the second flushing is, for example, 3.3 ms, but the flushing of the address table (FDB) sometimes takes a flush time (Tf) of 10 ms or longer.

In such a case, for example, the flushing of the address table (FDB) is started, and after 3.3 ms of the start of the flushing, namely, during the execution of the flushing, the flushing is started again (in other words, the flushing is restarted all over again). As a result, the time of "3.3 ms+flush time (Tf)" is required from the reception of the first R-APS (SF) frame to the actual completion of the flushing of the address table (FDB).

Furthermore, in the example of FIG. 3, the second R-APS (SF) frame at step S106 passes through the ring port released from the block state BK at step S105. However, it actually takes a time longer than 3.3 ms to release the block state BK in some cases. In this case, the second R-APS (SF) frame is blocked in the same manner as the first R-APS (SF) frame, and the frame which passes through the ring port released from the block state BK is a third R-APS (SF) frame in some cases. Consequently, a time of 3.3 ms is further added for the completion of the flushing of the address table (FDB).

<<Outline of Relay Device (Present Embodiment)>>

Figure 5:
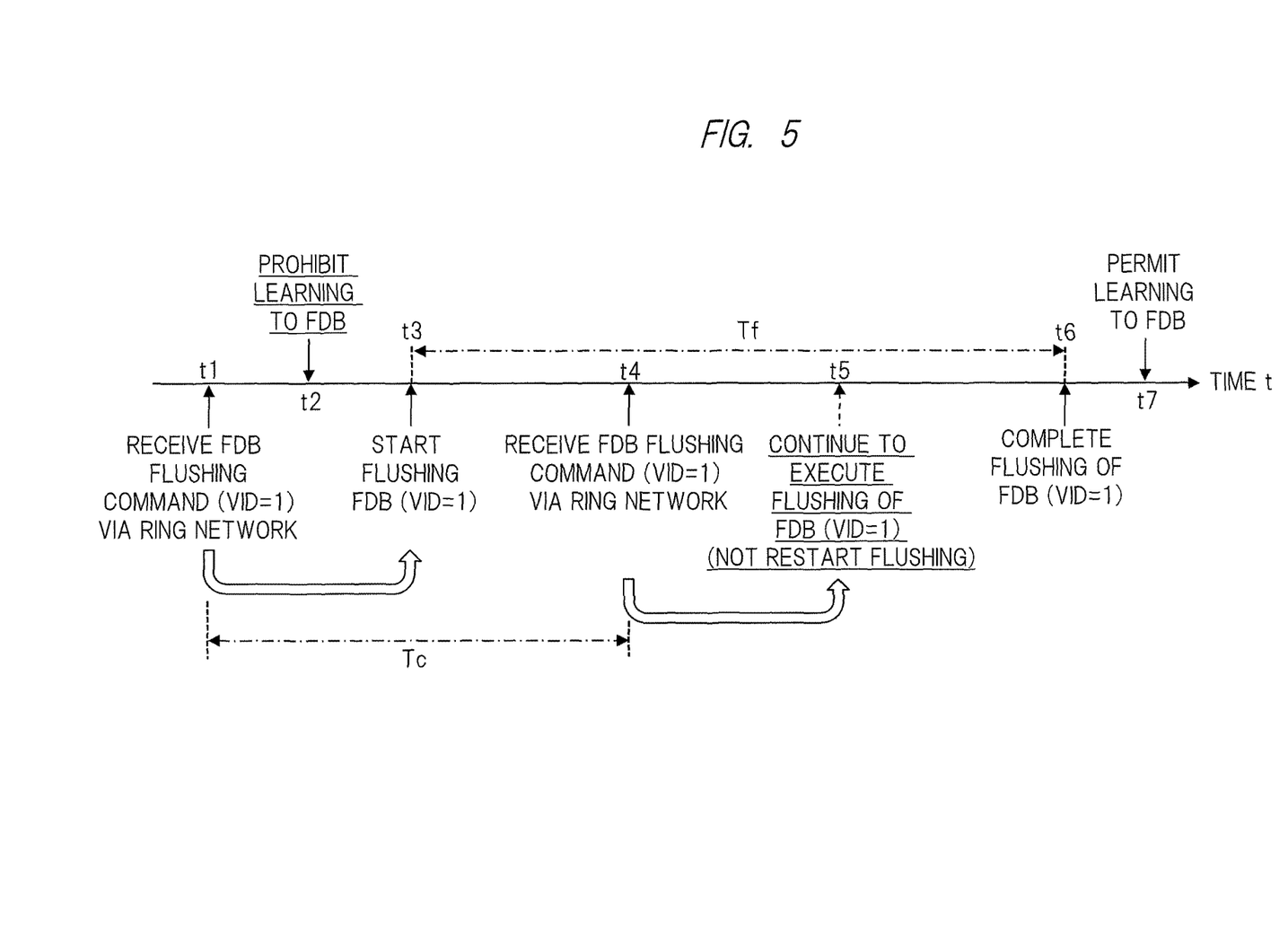
FIG. 5 is an explanatory diagram schematically illustrating an operation example of the principle part of the relay device according to the first embodiment of the present invention.

FIG. 5 is an explanatory diagram schematically illustrating an operation example of the principle part of the relay device according to the first embodiment of the present invention. FIG. 5 illustrates an operation example of at least any one of the relay devices in the relay system of FIGS. 1 and 3. In FIG. 5, although the operation of the relay device SWc of FIG. 3 is described here as a typical example, the same operation can be applied also to the other relay devices SWa, SWb, SWd, and SWe.

At time t1 in FIG. 5, the relay device SWc receives a first address table (FDB) flushing (deletion) command through the ring network. Specifically, the relay device SWc receives the flushing command via the control frame (R-APS (SF) frame) from the relay device SWd indicated by step S103 of FIG. 3. In this case, the subject of the first flushing command is assumed to be an entry having a VLAN (Virtual LAN) identifier (VID)=1 in the address table (FDB).

Subsequently, at time t2, the relay device SWc prohibits a learning process to the address table (FDB). At this time, the relay device SWc may prohibit a learning process to an entry having the VID=1, which is the subject of the first flushing command. Thereafter, at time t3, the relay device SWc starts flushing (deletion) of the address table (FDB).

Subsequently, in a period before the completion of the flushing of the address table (FDB), the relay device SWc receives a second flushing command at time t4 through the ring network. Specifically, the relay device SWc receives the flushing command via the control frame (R-APS (SF) frame) from the relay device SWe indicated by step S106 of FIG. 3. The subject of the second flushing command is the same entry having the VID=1 in the address table (FDB) as the subject of the first flushing command.

When receiving the second flushing command, the relay device SWc continues to execute the flushing of the address table (FDB) started at time t3, as indicated at time t5. Namely, the relay device SWc does not start the flushing of the address table (FDB) again (in other words, does not restart the flushing all over again). Also, though not illustrated, the relay device SWc continues to execute the flushing of the address table (FDB) in the same manner also when receiving a N-th (N is an integer of 2 or more) flushing command as well as the second flushing command in the period before the completion of the flushing of the address table (FDB).

Thereafter, the relay device SWc completes the flushing of the address table (FDB) at time t6 and then permits the learning process to the address table (FDB) at time t7. As described above, in FIG. 5, a period Tc between time t1 and time t4 is, for example, 3.3 ms and a period Tf between time t3 and time t6 (that is, a flush time of the address table (FDB)) is, for example, 10 ms or longer.

As described above, by use of the operation illustrated in FIG. 5, the time from reception of the first flushing (deletion) command of the address table (FDB) through the ring network to the actual completion of the flushing (deletion) of the address table (FDB) can be shortened. Namely, as described above, if the flushing is started again in response to the second flushing command, for example, the flush time Tf staring from time t5 is required. Meanwhile, in the case of adopting the method of FIG. 5, the flush time Tf staring from time t3 suffices for the completion of the flushing. As a result, the high-speed path switching on the ring network 10 can be realized. In addition, since it is not necessary to consecutively repeat the flushing of the address table (FDB) several times in the relay device, the processing load and power consumption can be reduced.

Here, the reason why it is not necessary to start the flushing again at time t5 is that the learning process to the address table (FDB) is prohibited at time t2. Thus, since no new entry is learned to the address table (FDB) in a period between time t3 and time t5, it is also not necessary to start the flushing again. Although the learning process to the address table (FDB) is prohibited in a period between time t2 and time t7 in this example, actually, it is desirable to prohibit also a retrieval process to the address table (FDB) in order to prevent the frame from being relayed to a wrong path.

Also, the relay device can carry out the flushing of the address table (FDB) for an entry having a predetermined VLAN identifier (VID) and entries having the ring ports (first and second ports) Pr[1] and Pr[2]. In this case, if the second flushing command at time t4 is the flushing command for a VLAN identifier (VID) different from the VLAN identifier (VID) that is the subject of the first flushing command, the relay device newly starts the flushing of the address table (FDB) for the VLAN identifier (VID) that is the subject of the second flushing command at time t5.

<<Configuration of Relay Device (Present Embodiment)>>

Figure 6:
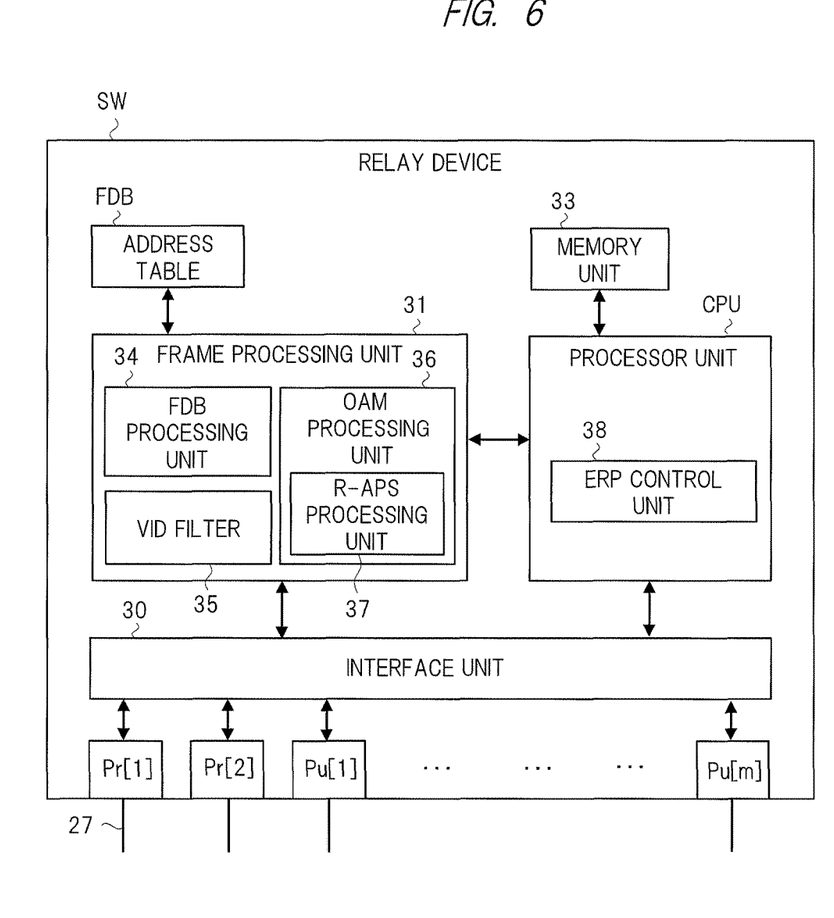
FIG. 6 is a block diagram illustrating a configuration example of the relay device of FIG. 5.
Figure 7:
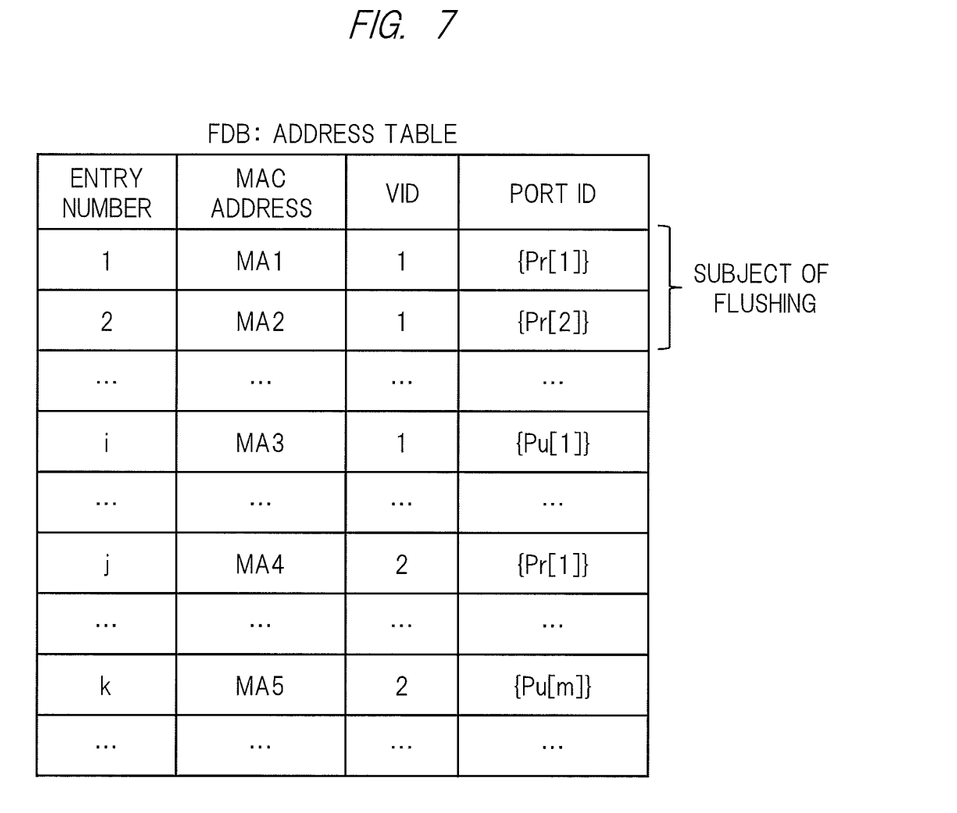
FIG. 7 is a schematic diagram illustrating a configuration example of the address table of FIG. 6.

FIG. 6 is a block diagram illustrating a configuration example of the relay device of FIG. 5. FIG. 7 is a schematic diagram illustrating a configuration example of the address table of FIG. 6. The relay device SW illustrated in FIG. 6 includes the ring ports (first and second ports) Pr[1] and Pr[2], the plurality of user ports Pu[1] to Pu[m], and various processing units. As illustrated in FIG. 1, the ring ports (first and second ports) Pr[1] and Pr[2] are connected to the ring network 10 via a communication line (for example, Ethernet line) 27. The plurality of user ports Pu[1] to Pu[m] are connected to predetermined user networks (any of user networks 11a to 11e). Hereinafter, the processing units will be described.

When an interface unit 30 receives a frame at any of the plurality of ports (ring ports Pr[1] and Pr[2] and user ports Pu[1] to Pu[m]), it adds an identifier of a port which has received the frame (referred to as reception port identifier) to the frame and transmits the frame to a frame processing unit 31 or a processor unit CPU. Also, the interface unit 30 transmits a frame from the frame processing unit 31 or the processor unit CPU to any of the plurality of ports based on a destination port identifier described later.

The address table FDB retains the correspondence relation among MAC (Media Access Control) addresses, VLAN identifiers (VID), and the plurality of ports. Specifically, as illustrated in FIG. 7, the address table FDB retains the correspondence relation among the MAC address, the VID, and the port identifier (ID) for each entry. In the example of FIG. 7, the correspondence relation among a MAC address MA1, a VID=1, and a ring port identifier {Pr[1]} is retained at an entry number=1, and the correspondence relation among a MAC address MA2, the VID=1, and a ring port identifier {Pr[2]} is retained at an entry number=2.

The frame processing unit 31 is provided with an FDB processing unit 34, a VID filter 35, and an OAM processing unit 36. The FDB processing unit (address table processing unit) 34 carries out a process to the address table FDB. Specifically, when receiving a frame (for example, user frame) at any of the plurality of ports, the FDB processing unit 34 carries out a learning process and a retrieval process to the address table FDB.

In the learning process, the FDB processing unit 34 learns a source MAC address contained in the received user frame to the address table FDB in association with predetermined VID and reception port identifier added by the interface unit 30. The predetermined VID is determined by a so-called tag VLAN, port VLAN, and others. In the retrieval process, the FDB processing unit 34 retrieves the address table FDB with using a destination MAC address contained in the received user frame and a VID corresponding to the destination MAC address as retrieval keys. The FDB processing unit 34 adds a port identifier obtained by the retrieval result (referred to as destination port identifier) to the user frame, and transmits the user frame to the interface unit 30.

The VID filter 35 determines whether or not a frame may be relayed in accordance with the VID. For example, the block state BK illustrated in FIG. 1 and others is realized by this VID filter 35. The OAM processing unit 36 has the monitoring points (MEP) illustrated in FIG. 2, and monitors continuity based on the Ethernet OAM. The OAM processing unit 36 has a R-APS processing unit 37.

The R-APS processing unit 37 performs the process of R-APS frames based on ITU-T G.8032. Specifically, the R-APS processing unit 37 discriminates a R-APS frame from among received frames and notifies various control information contained in the R-APS frame to an ERP control unit 38 described later. Contrary to that, the R-APS processing unit 37 generates a R-APS frame containing various control information notified from the ERP control unit 38, and transmits the R-APS frame from a predetermined ring port.

The processor unit CPU performs the various communication protocol processes, for which complicated process is required, in cooperation with the frame processing unit 31 or manages the overall relay device based on software (firmware) stored in a memory unit 33. The processor unit CPU is provided with an ERP control unit (ring control unit) 38 configured by executing firmware.

The ERP control unit (ring control unit) 38 controls the ring network based on the ring protocol specified by ITU-T G.8032. Specifically, the ERP control unit 38 controls the ring network by transmitting and receiving a control frame (that is, R-ARS frame) through the ring port (first port Pr[1] or second port Pr[2]) via the R-APS processing unit 37. Then, the ERP control unit 38 receives a flushing (deletion) command of the address table FDB described in FIG. 5 via the control frame.

Here, the FDB processing unit 34 performs various processes to the address table FDB illustrated in FIG. 5 when the ERP control unit 38 receives a flushing command, in addition to the learning process and retrieval process described above. Specifically, when a first flushing command is received, the FDB processing unit 34 prohibits the learning process of correspondence relation to the address table FDB and then starts flushing (deletion) of the address table FDB. Also, when a N-th (N is an integer of 2 or more) flushing command is received in a period before the completion of the flushing of the address table (FDB), the FDB processing unit 34 continues to execute the flushing of the address table FDB.

<<Ring Protocol Operation of Relay Device (Present Embodiment)>>

Figure 8:
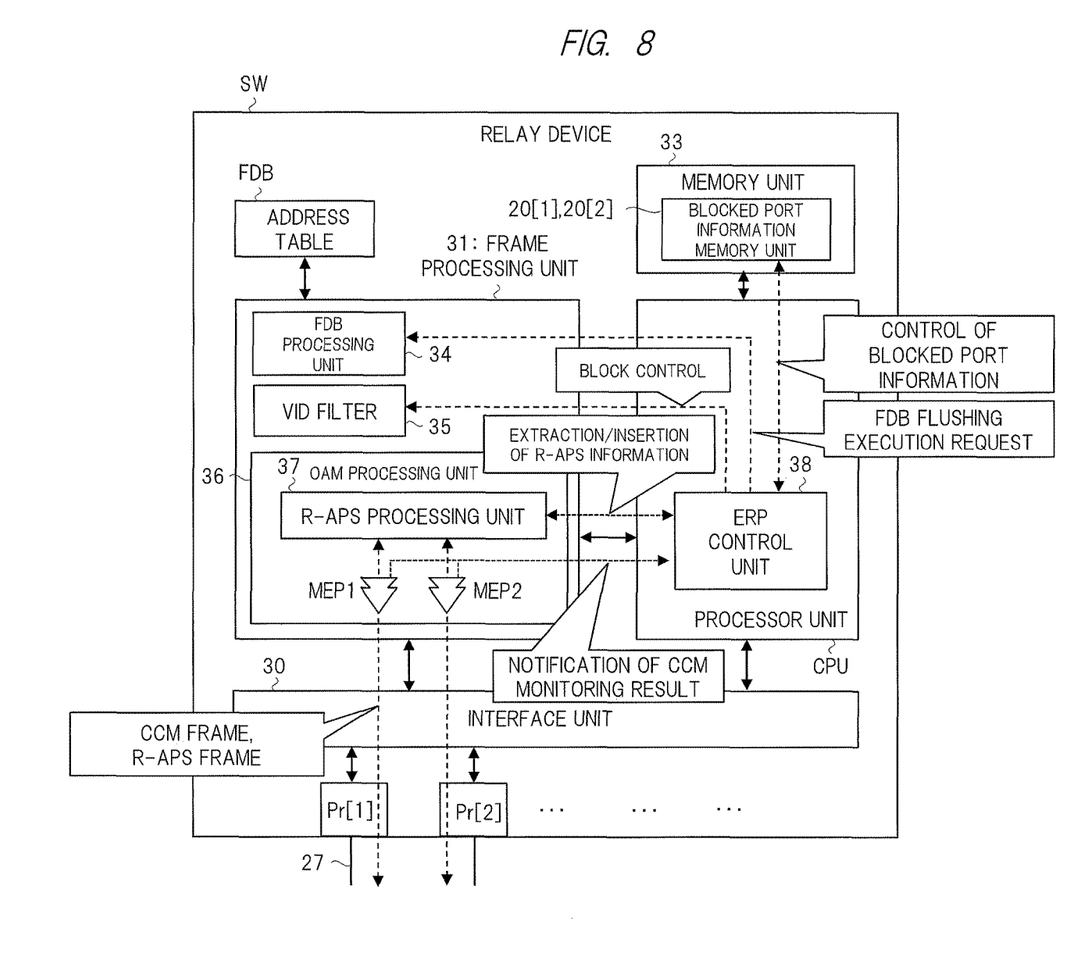
FIG. 8 is an explanatory diagram schematically illustrating an operation example around the ERP processing unit and the OAM processing unit in the relay device of FIG. 6.

FIG. 8 is an explanatory diagram schematically illustrating an operation example around the ERP processing unit and the OAM processing unit in the relay device of FIG. 6. In FIG. 8, the monitoring points MEP1 and MEP2 in the OAM processing unit 36 generate a CCM frame at regular intervals and transmit the CCM frame from the ring ports Pr[1] and Pr[2] via the interface unit 30, respectively. Also, the monitoring points MEP1 and MEP2 discriminate the CCM frame from among the frames received at the ring ports Pr[1] and Pr[2] and transmitted via the interface unit 30, respectively. The CCM frame is discriminated based on, for example, a destination MAC address of the frame and various identifiers in the frame.

The monitoring points MEP1 and MEP2 determine the presence or absence of continuity of the link connected to the ring ports Pr[1] and Pr[2] by transmitting and receiving the CCM frames at regular intervals, respectively. The determination result of the presence or absence of continuity (that is, presence or absence of recognition of the LOC state or RDI state) is notified to the ERP control unit 38. For example, when the absence of continuity is notified, the ERP control unit 38 performs the setting of a predetermined ring port, VID and others in the VID filter 35, thereby controlling the predetermined ring port to the block state BK as indicated by, for example, step S102 of FIG. 3.

The R-APS processing unit 37 transmits and receives a R-APS frame via the monitoring points MEP1 and MEP2. As described above, the R-APS frame is a kind of a control frame based on Ethernet OAM. When the R-APS processing unit 37 transmits the R-APS frame, the ERP control unit 38 inserts predetermined control information (R-APS information) in the R-APS frame. The predetermined control information (R-APS information) means a variety of information specified by ITU-T G.8032 typified by SF, NR, RB and others as described in FIG. 3.

Also, when the R-APS processing unit 37 receives the R-APS frame, the ERP control unit 38 extracts the predetermined control information (R-APS information) contained in the R-APS frame. Then, the ERP control unit 38 performs a predetermined control operation in accordance with the extracted control information. The predetermined control operation means various operations specified by ITU-T G.8032 typified by various control operations described in FIG. 3.

Specifically, the predetermined control operations include, for example, control of the block state BK for a ring port (for example, step S105 of FIG. 3) and control of relaying the R-APS frame between ring ports. The predetermined control operations further include comparison and update of blocked port information in the blocked port information memory units 20[1] and 20[2] and transmission of a flushing (deletion) execution request of the address table FDB in accordance with the comparison result illustrated in FIG. 3. The blocked port information memory units 20[1] and 20[2] are disposed in, for example, the memory unit 33 as illustrated in FIG. 8.

<<Flushing (Deletion) Operation of Address Table>>

Figure 9:
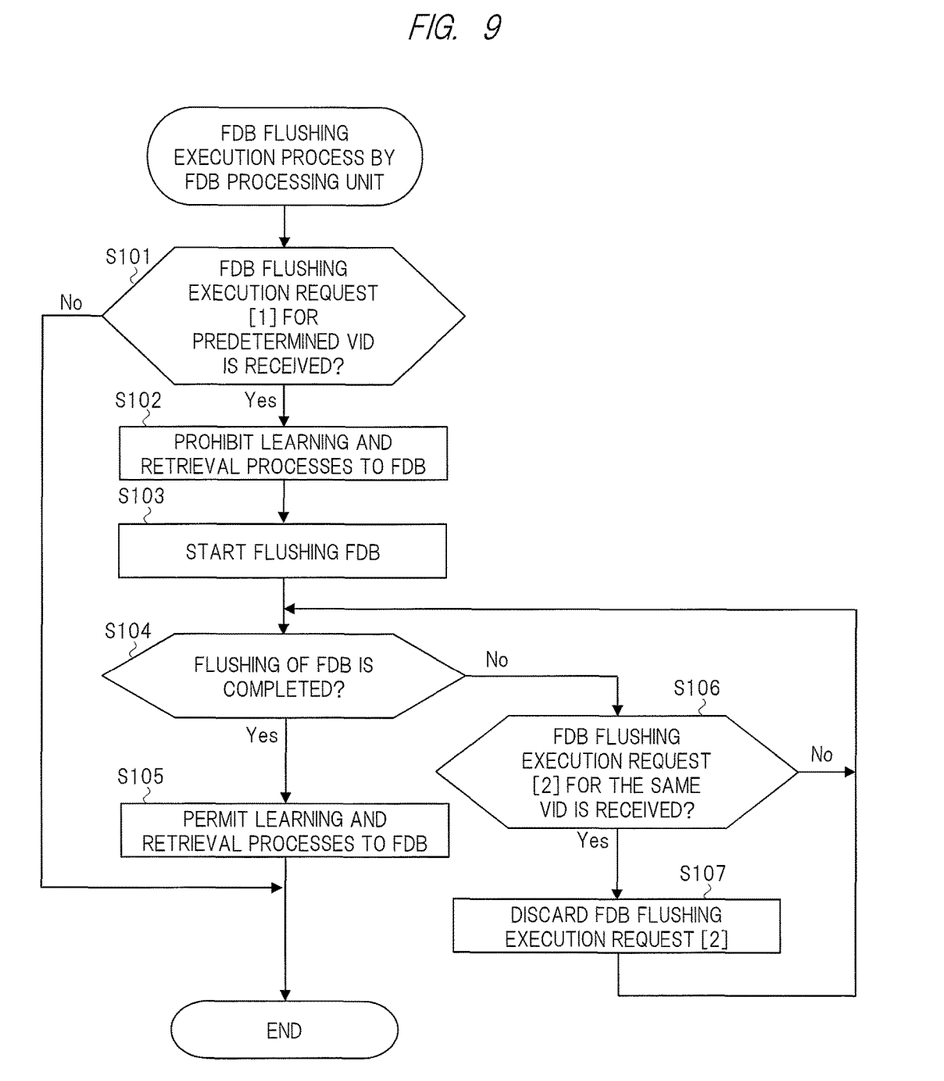
FIG. 9 is a flowchart illustrating an example of process contents performed by the FDB processing unit of FIGS. 6 and 8.

FIG. 9 is a flowchart illustrating an example of process contents performed by the FDB processing unit of FIGS. 6 and 8. As a premise, it is assumed that the ERP control unit (ring control unit) 38 of FIG. 8 transmits a flushing (deletion) execution request of the address table FDB to the FDB processing unit 34 every time when receiving a flushing command of the address table FDB via the ring network. In FIG. 9, the FDB processing unit 34 determines whether it has received a first flushing execution request [1] for a predetermined VID from the ERP control unit 38 (step S101).

When having received the flushing execution request [1], the FDB processing unit 34 prohibits a learning process and a retrieval process to the address table FDB (step S102). At this time, the FDB processing unit 34 may prohibit the learning process and the retrieval process for a predetermined VID, which is the subject of the first flushing execution request [1]. Thereafter, the FDB processing unit 34 starts flushing (deletion) of the address table FDB (step S103).

In this case, when the VID=1 is the subject of the first flushing execution request [1] at step S101, the FDB processing unit 34 determines the entry number=1 and entry number=2 (that is, entries including the VID=1 and ring port) illustrated in FIG. 7 as the subject of the flushing process. In other words, the FDB processing unit 34 does not determine an entry including a user port (entry number=i) or an entry including a different VID (entry number=j and entry number=k) as the subject of the flushing process.

Subsequently, the FDB processing unit 34 then determines whether the flushing of the address table FDB is completed (step S104). When having completed the flushing, the FDB processing unit 34 permits the learning process and retrieval process to the address table FDB (step S105) and ends the series of steps.

Meanwhile, when the FDB processing unit 34 does not complete the flushing yet (that is, the flushing is being executed) and receives a second flushing execution request [2] for the same VID that is the subject of the first flushing execution request [1] from the ERP control unit 38 (step S106), the FDB processing unit 34 discards the second flushing execution request [2] (step S107). In other words, when receiving a N-th (N is an integer of 2 or more) flushing execution request corresponding to a N-th flushing command from the ERP control unit 38, the FDB processing unit 34 discards the N-th flushing execution request.

As described above, by using the relay system and the relay device of the first embodiment, typically, the high-speed path switching on the ring network can be realized. This effect is particularly advantageous when the ring protocol specified by ITU-T G.8032 is adopted. Note that the relay device SW illustrated in FIG. 6 may be a box-type relay device or chassis-type relay device.

Second Embodiment

Flushing (Deletion) Operation of Address Table (Modification Example)

Figure 10:
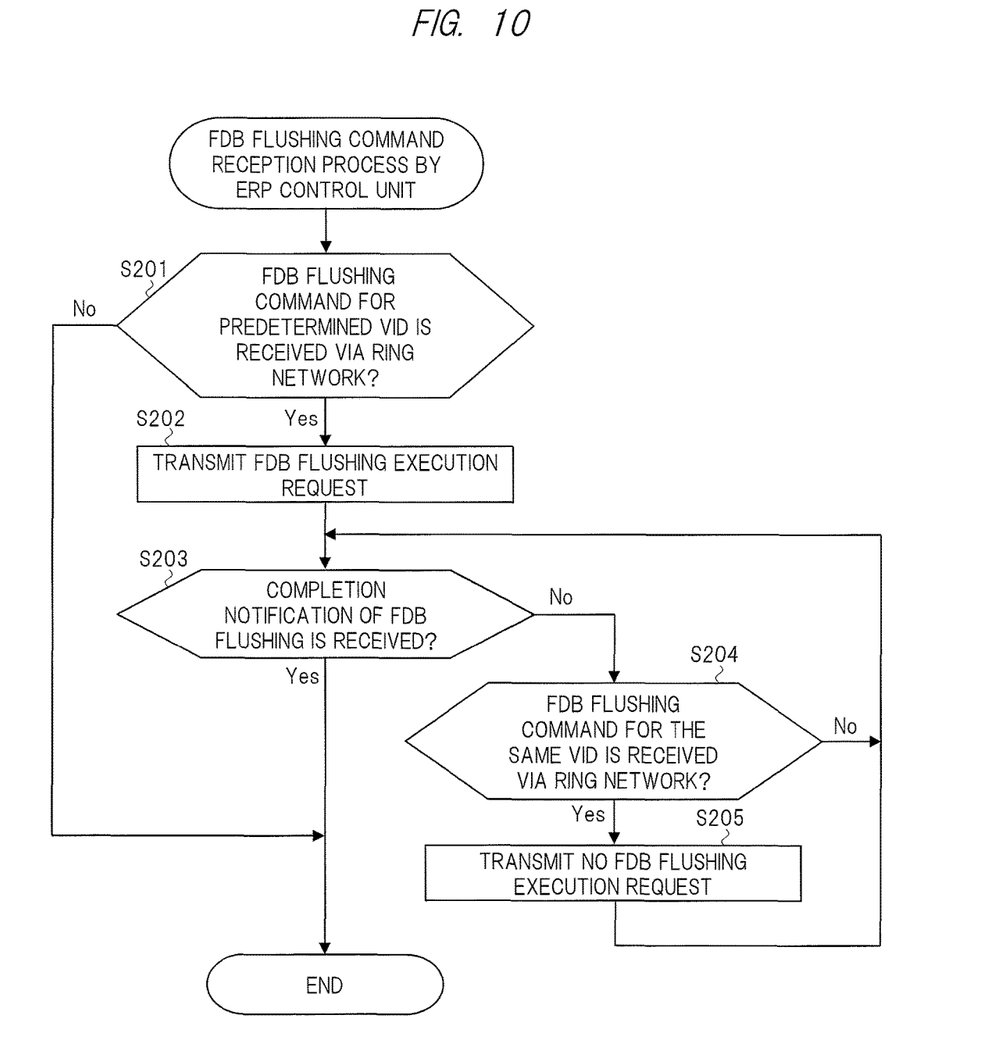

FIG. 10 is a flowchart illustrating an example of the process contents performed by the ERP control unit of FIGS. 6 and 8 in a relay device according to the second embodiment of the present invention. In the flowchart of FIG. 9 of the first embodiment, the FDB processing unit 34 performs the operation executed at time t5 of FIG. 5. However, as illustrated in FIG. 10, the operation at time t5 can be performed also by the ERP control unit 38.

In FIG. 10, the ERP control unit 38 determines whether it has received a first flushing (deletion) command of address table FDB for a predetermined VID via the ring network (step S201). When having received the flushing command, the ERP control unit 38 transmits a flushing (deletion) execution request of the address table FDB to the FDB processing unit 34 (step S202). In response to the request, the FDB processing unit 34 performs the operations at time t2 and time t3 illustrated in FIG. 5.

Thereafter, the ERP control unit 38 determines whether it has received a flushing completion notification from the FDB processing unit 34 (step S203). When the ERP control unit 38 does not receive the flushing completion notification yet (that is, the FDB processing unit 34 is still executing the flushing) and receives a second flushing command for the same VID that is the subject of the first flushing command via the ring network (step S204), the ERP control unit 38 transmits no flushing execution request (step S205). As a result, the FDB processing unit 34 performs the operation at time 5 illustrated in FIG. 5.

As described above, also by using the relay device of the second embodiment, the same effect as the relay device of the first embodiment can be obtained. From the viewpoint of realizing the operation specified by ITU-T G.8032, however, it is sometimes desirable that the ERP control unit 38 is configured to prompt the execution of the flushing command (that is, transmit a flushing execution request) every time when receiving the flushing command via the ring network. From this viewpoint, the method in FIG. 9 of the first embodiment is more preferable.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, although the case where a neighbor node is set in a ring network is taken as an example in the description above, the method of the present embodiment can be similarly applied also to the case where a neighbor node is not set and only an owner node is set. Furthermore, the ERP control unit 38 does not necessarily need to be configured by the processor unit CPU, and may be configured by dedicated hardware depending on the case.

Also, although the operation in the occurrence of a fault (SF) is taken as an example in the description above, the same problem may arise at the neighbor node in the recovery from a fault as described in the Patent Document 1. Briefly describing, when the neighbor node (SWb of FIG. 3) receives a first R-APS (NR, RB) frame from the owner node in accordance with the recovery from a fault, the neighbor node controls a predetermined ring port (Pr[2]) to the block state BK and starts flushing the address table, thereby deleting information retained in the blocked port information memory unit. Therefore, when the neighbor node receives a second R-APS (NR, RB) frame, the blocked port information memory unit is updated, and the flushing of the address table needs to be started again in some cases. Even in such a case, by applying the method of the embodiments described above, the start of the second and subsequent flushing processes can be avoided.

What is claimed is:

1. A relay system including a plurality of relay devices constituting a ring network, at least one of the plurality of relay devices comprising:
    a plurality of ports including a first port and a second port connected to the ring network;
    an address table processor that performs a process on an address table retaining a correspondence relation among a MAC address, a VLAN identifier, and the plurality of ports; and
    an Ethernet Ring Protection controller that controls the ring network by transmitting and receiving a control frame through the first port or the second port and receives deletion commands to delete the address table via the control frame, wherein,
    when a first deletion command of the deletion commands is received, the address table processor prohibits a learning process of the correspondence relation retained in the address table and then starts deleting the address table, and when N is an integer of 2 or more and a N-th deletion command of the deletion commands is received in a period before completion of the deletion of the address table, the address table processor continues to execute the deletion of the address table.

2. The relay system according to claim 1, wherein the Ethernet Ring Protection controller controls the ring network based on a ring protocol specified by ITU-T G.8032, and receives the deletion command to delete the address table via a R-APS (SF) frame.

3. The relay system according to claim 1, wherein, when the first deletion command is received, the address table processor prohibits also a retrieval process of the correspondence relation in addition to the learning process of the correspondence relation retained in the address table.

4. The relay system according to claim 1, wherein, when the N-th deletion command is received and the VLAN identifier which is a subject of the N-th deletion command is the same as the VLAN identifier which is a subject of the first deletion command, the address table processor continues to execute the deletion of the address table.

5. The relay system according to claim 1, wherein, every time when receiving the deletion command, the Ethernet Ring Protection controller transmits a deletion execution request for executing deletion of the address table to the address table processor, and
    when receiving a N-th deletion execution request corresponding to the N-th deletion command from the Ethernet Ring Protection controller, the address table processor discards the N-th deletion execution request.

6. A relay device constituting a ring network, comprising:
    a plurality of ports including a first port and a second port connected to the ring network;
    an address table which processor that performs a process on an address table retaining a correspondence relation among a MAC address, a VLAN identifier, and the plurality of ports; and
    an Ethernet Ring Protection controller that controls the ring network by transmitting and receiving a control frame through the first port or the second port and receives deletion commands to delete the address table via the control frame,
    wherein, when a first deletion command of the deletion commands is received, the address table processor prohibits a learning process of the correspondence relation retained in the address table and then starts deleting the address table, and when N is an integer of 2 or more and an N-th deletion command of the deletion commands is received in a period before completion of the deletion of the address table, the address table processor continues to execute the deletion of the address table.

7. The relay device according to claim 6, wherein the Ethernet Ring Protection controller controls the ring network based on a ring protocol specified by ITU-T G.8032, and receives the deletion command to delete the address table via a R-APS (SF) frame.

8. The relay device according to claim 6, wherein, when the first deletion command is received, the address table processor prohibits also a retrieval process of the correspondence relation in addition to the learning process of the correspondence relation retained in the address table.

9. The relay device according to claim 6, wherein, when the N-th deletion command is received and the VLAN identifier which is a subject of the N-th deletion command is the same as the VLAN identifier which is a subject of the first deletion command, the address table processor continues to execute the deletion of the address table.

10. The relay device according to claim 6, wherein, every time when receiving the deletion command, the Ethernet Ring Protection controller transmits a deletion execution request for executing deletion of the address table to the address table processor, and when receiving a N-th deletion execution request corresponding to the N-th deletion command from the Ethernet Ring Protection controller, the address table processor discards the N-th deletion execution request.

* * * * *